(12) United States Patent
Hayashi

(10) Patent No.: US 7,853,971 B2
(45) Date of Patent: Dec. 14, 2010

(54) BROADCASTING SIGNAL RECEIVER APPARATUS PROVIDED WITH CONTROLLER FOR CONTROLLING DEMODULATION MODE, AND APPARATUS FOR CONTROLLING DEMODULATION MODE

(75) Inventor: Yoshikazu Hayashi, Ibaraki (JP)

(73) Assignee: Panasonic Corporation, Osaka (JP)

( * ) Notice: Subject to any disclaimer, the term of this patent is extended or adjusted under 35 U.S.C. 154(b) by 1224 days.

(21) Appl. No.: 10/829,189

(22) Filed: Apr. 22, 2004

(65) Prior Publication Data

US 2005/0010945 A1 Jan. 13, 2005

(30) Foreign Application Priority Data

Apr. 23, 2003 (JP) ............................. 2003-118244

(51) Int. Cl.
*H04N 7/167* (2006.01)
(52) U.S. Cl. ...................... 725/31; 725/131; 725/139; 725/151
(58) Field of Classification Search ................. 725/31, 725/131, 139, 151; 348/731
See application file for complete search history.

(56) References Cited

U.S. PATENT DOCUMENTS

| | | | | |
|---|---|---|---|---|
| 6,069,647 | A * | 5/2000 | Sullivan et al. | 725/29 |
| 6,714,262 | B1 * | 3/2004 | Tsurumi | 348/731 |
| 6,751,197 | B1 * | 6/2004 | Sadanaka | 370/252 |
| 7,568,208 | B1 * | 7/2009 | Dinwiddie et al. | 725/30 |
| 2002/0157115 | A1 * | 10/2002 | Lu | 725/131 |
| 2004/0086127 | A1 * | 5/2004 | Candelore | 380/281 |
| 2005/0144646 | A1 * | 6/2005 | Lecrom et al. | 725/100 |
| 2005/0144651 | A1 * | 6/2005 | Prus et al. | 725/134 |

FOREIGN PATENT DOCUMENTS

| | | |
|---|---|---|
| JP | 9-168039 | 6/1997 |
| JP | 11-239192 | 8/1999 |
| JP | 2000-183992 | 6/2000 |
| JP | 2000-236488 | 8/2000 |
| JP | 2001-24721 | 1/2001 |

OTHER PUBLICATIONS

Cable Television Laboratories, Inc.: OpenCable™ Host Device Core Functional Requirements, Issued Specification, OC-SP-HOST-CFR-I10-020628, pp. 1-47, updated on Jun. 28, 2002, http://www.opencable.com/specifications/ as issued by Cable Television Laboratories, Inc.

* cited by examiner

*Primary Examiner*—Brian T Pendleton
*Assistant Examiner*—Olugbenga Idowu
(74) *Attorney, Agent, or Firm*—Wenderoth, Lind & Ponack, L.L.P.

(57) ABSTRACT

A set-top box is configured to mount therein a security device which stores security information on a broadcasting entity, and extracts transmission information for receiving a broadcasting signal modulated from a control signal from a head end. In the set-top box, it is detected that the security device is not mounted into a receiver, the demodulation mode for the broadcasting signal and/or the frequency of the broadcasting signal is changed to retrieve the broadcasting channel on which the transmission information on the broadcasting signal is transmitted, and then, the broadcasting signal on the retrieved broadcasting channel is received. When it is detected that a demodulator is synchronized with the broadcasting signal, the transmission information on the broadcasting channel is extracted from the demodulated broadcasting signal, the broadcasting signal is received based on the extracted transmission information on the broadcasting signal.

14 Claims, 9 Drawing Sheets

Fig.3

DEMODULATION MODE TABLE

| DEMODULATION MODE | 0 | 1 |
|---|---|---|
| DEMODULATION SYSTEM | 256QAM | 64QAM |
| BAUD RATE | 5.3605 Mbaud | 5.0569 Mbaud |
| ROLL-OFF COEFFICIENT | 0.12 | 0.18 |

FIRST MODIFIED PREFERRED EMBODIMENT

BROADCASTING SIGNAL RECEIVER APPARATUS PROVIDED WITH CONTROLLER FOR CONTROLLING DEMODULATION MODE, AND APPARATUS FOR CONTROLLING DEMODULATION MODE

BACKGROUND OF THE INVENTION

1. Field of the Invention

The present invention relates to a broadcasting signal receiver apparatus and a demodulation mode. More specifically, the present invention relates to a broadcasting signal receiver apparatus which receives a broadcasting signal of, for example, a cable television (referred to as a CATV hereinafter), and an apparatus for controlling a demodulation mode for controlling the demodulation mode upon demodulating a modulated received signal such as the broadcasting signal or the like.

2. Description of the Related Art

In recent years, following the progress of video digitalization, every country has started digital broadcasting through broadcasting media of satellite broadcasting, CATV broadcasting, and terrestrial broadcasting. Various kinds of transmission systems have been proposed as those suited for features of respective transmission lines. In particular, in the CATV broadcasting, various kinds of services such as a pay-per-view service or the like are provided taking advantage of stability and an interactiveness of the transmission line. According to a conventional CATV broadcasting system, an individual transmission system including a conditional access (referred to as a CA hereinafter) is adopted for each network operator, that is, each CATV broadcasting entity. Due to this, a manufacturer manufactures a set-top box (referred to as an STB hereinafter) and supplies the STB to each network operator based on standards of the network operator. A viewer concludes a viewing contract with each network operator and leases the STB from the network operator.

In these circumstances, in North America where 70% or more of TV viewers receive broadcasting programs through CATV, standards of separating apparatus parts such as the CA depending on each network operator from the STB for the CATV is disclosed by, for example, specifications for Open-Cable (trademark), i.e., a prior-art technical literature of Cable Television Laboratories, Inc.: OpenCable™ Host Device Core Functional Requirements, Issued Specification, OC-SP-HOST-CFR-I10-020628, pp. 1-47, updated on Jun. 28, 2002, http://www.opencable.com/specifications/ as issued by Cable Television Laboratories, Inc for promotion of making STB's for CATV marketable. Based on the standards, each manufacturer is capable of making the CATV STB marketable integrally with a television receiver, a DVD player, a DVD recorder, or the like. In addition, the number of choices of products increases for consumers.

A security card which is provided depending on the network operator and which stores security information on each network operator and broadcasting signals from the network operator and a control program is mounted into the STB as disclosed by the prior art document. The security card is also referred to as a point of deployment (POD) module or cable card. When a viewer having this STB sees a toll broadcasting program, the viewer inserts the security card into the STB. Then, the security card generates a descrambling key based on CA information, and outputs the descrambling key to the STB. The STB descrambles and MPEG-decodes data on a toll broadcasting signal based on the inputted descrambling key, and acquires a video signal and a voice signal.

However, a viewer who sees only toll-free broadcasting programs does not necessarily mount the security card into the STB. If so, it disadvantageously takes a lot of time to select a channel for the broadcasting signal.

SUMMARY OF THE INVENTION

It is an object of the present invention to provide a broadcasting signal receiver apparatus which can solve the disadvantages, and which enables selecting a desired channel for a broadcasting signal more quickly even if a viewer who sees only toll-free broadcasting programs or the like does not mount a security card into a set-top box, and an apparatus for controlling a demodulation mode for the broadcasting signal receiver apparatus or the like.

According to a first aspect of the present invention, there is provided a broadcasting signal receiver apparatus including a security device and a receiver. The security device stores security information on a broadcasting entity, and extracts transmission information for receiving a broadcasting signal modulated in a predetermined modulation mode from a control signal transmitted from an apparatus of the broadcasting entity. The receiver receives the broadcasting signal transmitted from the apparatus of the broadcasting entity based on the extracted transmission information. The security device is separated from the receiver, and can be mounted in the receiver. The broadcasting signal receiver apparatus further includes a tuner, a demodulator, a first controller, a synchronization judgment unit, a device detector, and a second controller. The tuner controls a frequency of the received broadcasting signal to select a channel of a predetermined broadcasting signal. The demodulator is capable of demodulating the broadcasting signal transmitted from the apparatus of the broadcasting entity in a plurality of demodulation modes corresponding to modulation modes of modulation systems of the broadcasting signal, and the demodulator demodulates the broadcasting signal of the channel selected by the tuner in a demodulation mode which is set among the plurality of demodulation modes. The first controller controls the demodulation mode of the demodulator, and the synchronization judgment unit judges whether or not the demodulator is synchronized with the received broadcasting signal, and outputs a synchronization judgment result signal. The device detector detects whether or not the security device is mounted into the receiver. When the device detector detects that the security device is not mounted into the receiver, the second controller controls the tuner, the demodulator, and the first controller, so as to change at least one of the demodulation mode for the broadcasting signal and the frequency of the broadcasting signal, and to retrieve the broadcasting channel on which the transmission information on the broadcasting signal is transmitted. Then the second controller receives the broadcasting signal on the retrieved broadcasting channel. When the synchronization judgment unit judges that the demodulator is synchronized with the broadcasting signal, the second controller extracts the transmission information on the broadcasting channel from the broadcasting signal demodulated by the demodulator, and receives the broadcasting signal based on the extracted transmission information on the broadcasting signal.

In the above-mentioned broadcasting signal receiver apparatus, the second controller initializes a demodulation mode control processing executed by the first controller immediately after the frequency of the tuner is changed.

Also, in the above-mentioned broadcasting signal receiver apparatus, the first controller controls at least one of a modulation rate, filter coefficients, and a constellation which are set to the demodulator based on the synchronization judgment result signal from the synchronization judgment unit until the demodulator is synchronized with the received broadcasting signal.

Further, in the above-mentioned broadcasting signal receiver apparatus, the demodulator includes a carrier recovery circuit which reproduces a carrier wave of the received broadcasting signal, and the synchronization judgment unit judges whether or not the demodulator is synchronized with the received broadcasting signal based on a phase error of a signal reproduced by the carrier recovery circuit.

Further, in the above-mentioned broadcasting signal receiver apparatus, the demodulator includes a clock recovery circuit which reproduces a clock signal of the received broadcasting signal, and the synchronization judgment unit judges whether or not the demodulator is synchronized with the received broadcasting signal based on a phase error of the clock signal reproduced by the clock signal recovery circuit.

Further, in the above-mentioned broadcasting signal receiver apparatus, the demodulator includes an error correction circuit which corrects an error of the received broadcasting signal, and the synchronization judgment unit judges whether or not the demodulator is synchronized with the received broadcasting signal based on whether or not a frame synchronous signal outputted from the error correction circuit can be detected.

Still further, in the above-mentioned broadcasting signal receiver apparatus, each of the first controller and the synchronization judgment unit is constituted by a hardware circuit.

According to a second aspect of the present invention, there is provided an apparatus for controlling a demodulation mode including a demodulator, a controller, and a synchronization judgment unit. The demodulator is capable of demodulating a received signal modulated in a predetermined modulation mode, in a plurality of demodulation modes corresponding to modulation modes of modulation systems of the received signal, and the demodulator demodulates the received signal in a demodulation mode which is set among the plurality of demodulation modes. The controller controls the demodulation mode of the demodulator, and the synchronization judgment unit judges whether or not the demodulator is synchronized with the received signal, and outputs a synchronization judgment result signal. The controller controls the demodulation mode of the demodulator based on the synchronization judgment result signal from the synchronization judgment unit until the demodulator is synchronized with the received signal.

Also, in the above-mentioned apparatus for controlling a demodulation mode, the controller controls at least one of a modulation rate, filter coefficients and a constellation which are set to the demodulator based on the synchronization judgment result signal from the synchronization judgment unit until the demodulator is synchronized with the received signal.

Further, in the above-mentioned apparatus for controlling a demodulation mode, the demodulator includes a carrier recovery circuit which reproduces a carrier wave of the received signal, and the synchronization judgment unit judges whether or not the demodulator is synchronized with the received signal based on a phase error of a signal reproduced by the carrier recovery circuit.

Further, in the above-mentioned apparatus for controlling a demodulation mode, the demodulator includes a clock recovery circuit which reproduces a clock signal of the received signal, and the synchronization judgment unit judges whether or not the demodulator is synchronized with the received signal based on a phase error of the clock signal reproduced by the clock recovery circuit.

Further, in the above-mentioned apparatus for controlling a demodulation mode, the demodulator includes an error correction circuit which corrects an error of the received signal, and the synchronization judgment unit judges whether or not the demodulator is synchronized with the received signal based on whether or not a frame synchronous signal outputted from the error correction circuit can be detected.

Still further, in the above-mentioned apparatus for controlling a demodulation mode, each of the controller and the synchronization judgment unit is constituted by a hardware circuit.

According to the broadcasting signal receiver apparatus according to the present invention, when the device detector detects that the security device is not mounted into the receiver, the tuner, the demodulator and the first controller are controlled so as to change at least one of the demodulation mode for the broadcasting signal and the frequency of the broadcasting signal, and to retrieve the broadcasting channel on which the transmission information on the broadcasting signal is transmitted. Then, the broadcasting signal on the retrieved broadcasting channel is received. When the synchronization judgment unit judges that the demodulator is synchronized with the broadcasting signal, the transmission information on the broadcasting channel is extracted from the broadcasting signal demodulated by the demodulator, and the broadcasting signal is received based on the extracted transmission information on the broadcasting signal. Accordingly, even if a viewer who sees only toll-free broadcasting programs or the like does not mount the security card into the set-top box, a desired channel for a broadcasting signal can be selected more quickly.

Further, according to the apparatus for controlling a demodulation mode according to the present invention, the demodulation mode of the demodulator is controlled based on the synchronization judgment result signal from the synchronization judgment unit until the demodulator is synchronized with the received signal. Accordingly, the demodulation mode of the received signal can be detected and controlled more certainly at a higher speed, as compared with the prior art.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 3 is a diagram showing a demodulation mode table stored in a data memory 23*m* shown in FIG. 1;

DETAILED DESCRIPTION OF THE PREFERRED EMBODIMENTS

Preferred embodiments according to the present invention will be described below with reference to the attached drawings. Components similar to each other are denoted by same reference, respectively.

Figure 1:
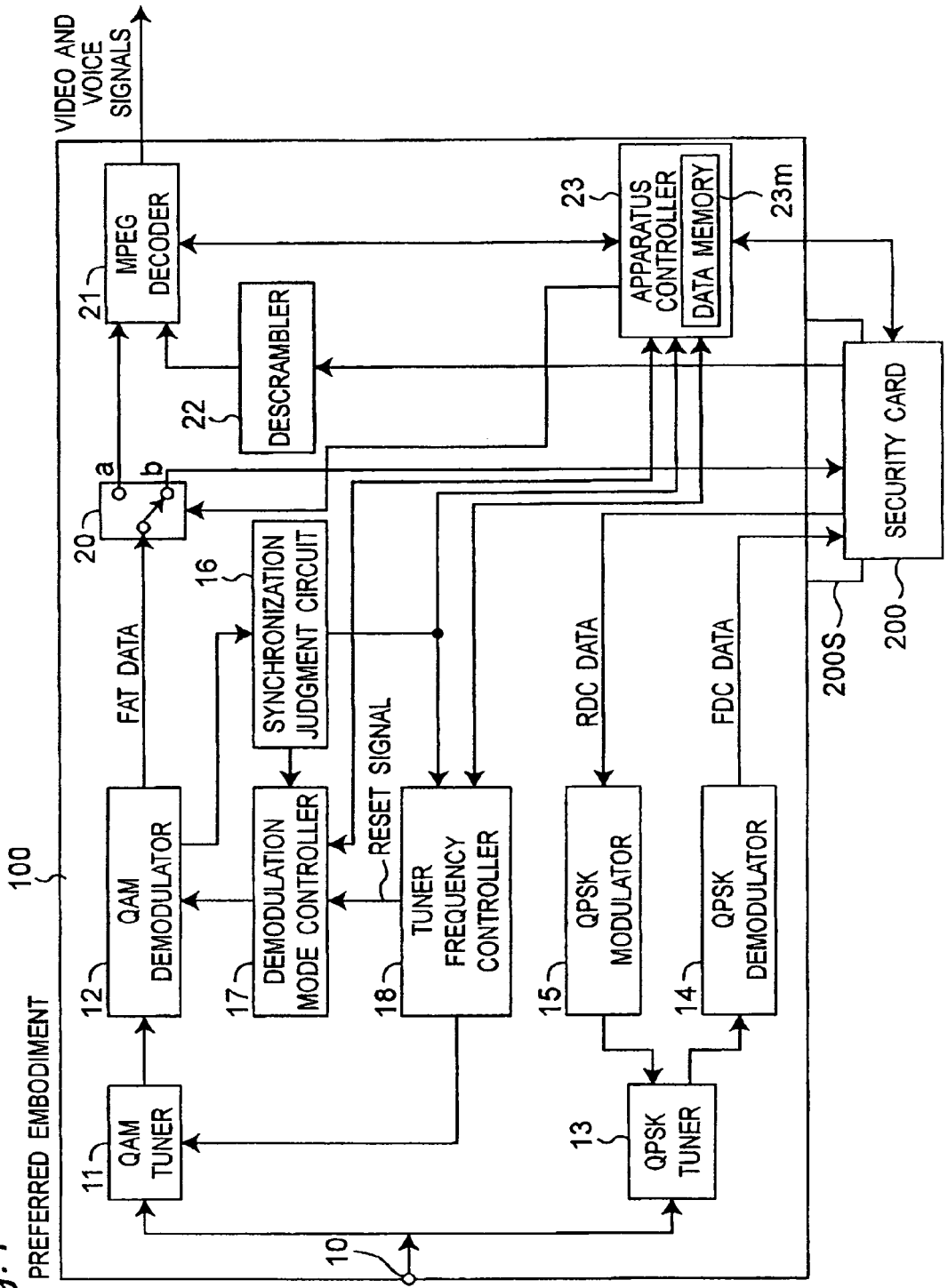
FIG. 1 is a block diagram showing a configuration of a set-top box 100 and a security card 200 for receiving a CATV broadcasting signal, according to a preferred embodiment of the present invention.

FIG. 1 is a block diagram showing a configuration of a set-top box (STB) 100 and a security card 200 for receiving a CATV broadcasting signal, according to a preferred embodiment of the present invention. The security card 200 is a security device that stores security information on a CATV broadcasting entity and on broadcasting signals transmitted from a head end apparatus of the CATV broadcasting entity, and that stores a control program for extracting transmission information for receiving a broadcasting channel signal from a control signal transmitted from the head end apparatus of the company. The security card 200 is mounted into a slot 200S of the STB 100 according to the present preferred embodiment. In this case, since the security card 200 executes signal processings dependent on the broadcasting entity, the security card 200 is also referred to as a POD module.

Referring to FIG. 1, the STB 100 includes an RF terminal 10, a QAM tuner 11, a QAM demodulator 12, a demodulation mode controller 17, a synchronization judgment circuit 16, a tuner frequency controller 18, a QPSK tuner 13, a QPSK demodulator 14, a QPSK modulator 15, a switch 20, an MPEG (Moving Picture Experts Group) demodulator 21, a descrambler 22, and an apparatus controller 23 including a data memory 23m. The STB 100 according to the present preferred embodiment is characterized particularly by including the demodulation mode controller 17 for controlling a demodulation mode of the QAM demodulator 12, the synchronization judgment circuit 16 which executes a synchronization judgment based on an output signal from the QAM demodulator 12, and the tuner frequency controller 18 for controlling a tuning frequency of the QAM tuner 11.

Referring to FIG. 1 again, signals inputted and outputted through the RF terminal 10 are generally classified to signals on the following three types of channels, which enable an interactive service. The signals on the three types of channels are transmitted respectively through divided frequency bands shown in FIG. 9.

Figure 9:
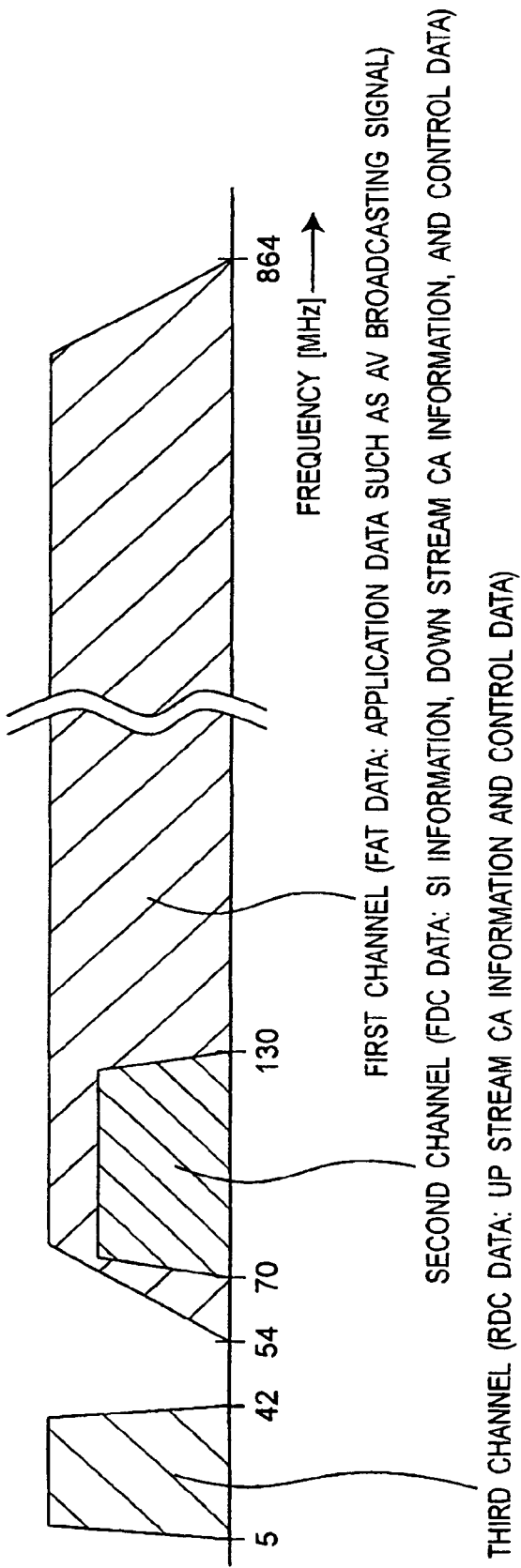
FIG. 9 is a diagram showing an arrangement of channels used by a CATV for the set-top box 100 shown in FIG. 1.

Referring to FIG. 9, a first channel is a channel in a frequency band from 54 to 864 MHz, for transmitting an application-related broadcasting signal such as a video signal and a voice signal with a frequency band of 6 MHz per channel. The first channel is referred to as an FAT channel (Forward Application Transport Channel). The broadcast signal on the first channel is modulated according to a 256 QAM or 64 QAM digital modulation system. A second channel is a channel in a frequency band from 70 to 130 MHz, for transmitting service information (SI) and conditional access (CA) for reception of an FAT channel with a frequency band of 1 to 2 MHz per channel. The second channel is referred to as an FDC channel (Forward Data Channel). A control signal on the second channel is digital-modulated according to a QPSK modulation system. A third channel is a channel in a frequency band of 5 to 42 MHz, for transmitting request information from a broadcasting signal receiver apparatus such as the STB to a head end with a frequency band of 1 to 2 MHz per channel. The third channel is referred to as an RDC channel (Reverse Data Channel). A control signal on the third channel is QPSK-modulated to a digital signal.

Respective signal processings for the signals on the three types of channels inputted and outputted through the RF terminal 10 will be described below.

Broadcasting signals on the FAT channel are inputted to the STB through the RF terminal 10. Thereafter, the QAM tuner 11 extracts only one desired broadcasting signal among a plurality of QAM-modulated broadcasting signals present in the frequency band from 54 to 864 MHz, and outputs the extracted broadcasting signal to the QAM demodulator 12. The QAM demodulator 12 can demodulate broadcasting signals received in a plurality of demodulation modes corresponding to modulation systems of the demodulated broadcasting signals. The QAM demodulator 12 carries out processings such as clock recovery, automatic gain control, carrier recovery, waveform equalization, and error correction or the like on the inputted QAM-modulated broadcasting signal, demodulates the FAT data in the demodulation mode of the demodulation system corresponding to the modulation system of the modulated broadcasting signal, and outputs the demodulated FAT data to the switch 20. The switch 20 is controlled by the apparatus controller 23 to be selectively switched over to a contact "a" or a contact "b". When the security card 200 is mounted into the slot 200S of the STB 100, the switch 20 is switched over to the contact "b". The FAT data from the QAM demodulator 12 is outputted to the security card 200. When the security card 200 is not mounted into the slot 200S of the STB 100, the switch 20 is switched over to the contact "a". The FAT data from the QAM demodulator 12 is outputted to the MPEG decoder 21.

When the security card 200 is mounted into the slot 200S of the STB 100, the security card 200 generates a descrambling key based on FDC data or a CA information extracted from the FAT data, and outputs the descrambling key to the descrambler 22. The descrambler 22 descrambles the toll FAT data based on the descrambling key, and outputs the descrambled FAT data to the MPEG decoder 21. The MPEG decoder 21 MPEG-decodes the FAT data inputted from the switch 20 or the FAT data inputted from the descrambler 22, so as to reproduce and output the video and voice signals. When the security card 200 is not mounted into the slot 200S of the STB 100, the switch 20 is switched over to the contact "a". The FAT data from the QAM demodulator 12 is inputted to the MPEG decoder 21. When the FAT data is not scrambled, the MPEG decoder 21 executes an MPEG decoding processing to the FAT data.

The FDC data is inputted to the QPSK tuner 13 through the RF terminal 10. The QPSK tuner 13 extracts a QPSK-modulated control signal in the frequency band from 70 to 130 MHz, and outputs the extracted control signal to the QPSK demodulator 14. The QPSK demodulator 14 carries out processings such as clock recovery, automatic gain control, carrier recovery, waveform equalization, and error correction or the like on the inputted QPSK-modulated control signal, demodulates the FDC data, and outputs the demodulated FDC data to the security card 200. In response to this, the security card 200 extracts SI information and CA information for FAT channel reception based on the FDC data outputted from the QPSK demodulator 14.

Further, the RDC data is generated by the security card 200, and is inputted to the QPSK modulator 15. The QPSK modulator 15 QPSK-modulates a control signal according to the inputted RDC data, and outputs the QPSK-modulated control signal to the QPSK tuner 13. The QPSK tuner 13 subjects the inputted control signal to a frequency conversion so as to convert a frequency of the control signal to a frequency in the frequency band from 5 to 42 MHz, and transmits the frequency-converted control signal to the head end apparatus of the broadcasting entity through the RF terminal 10.

Figure 2:
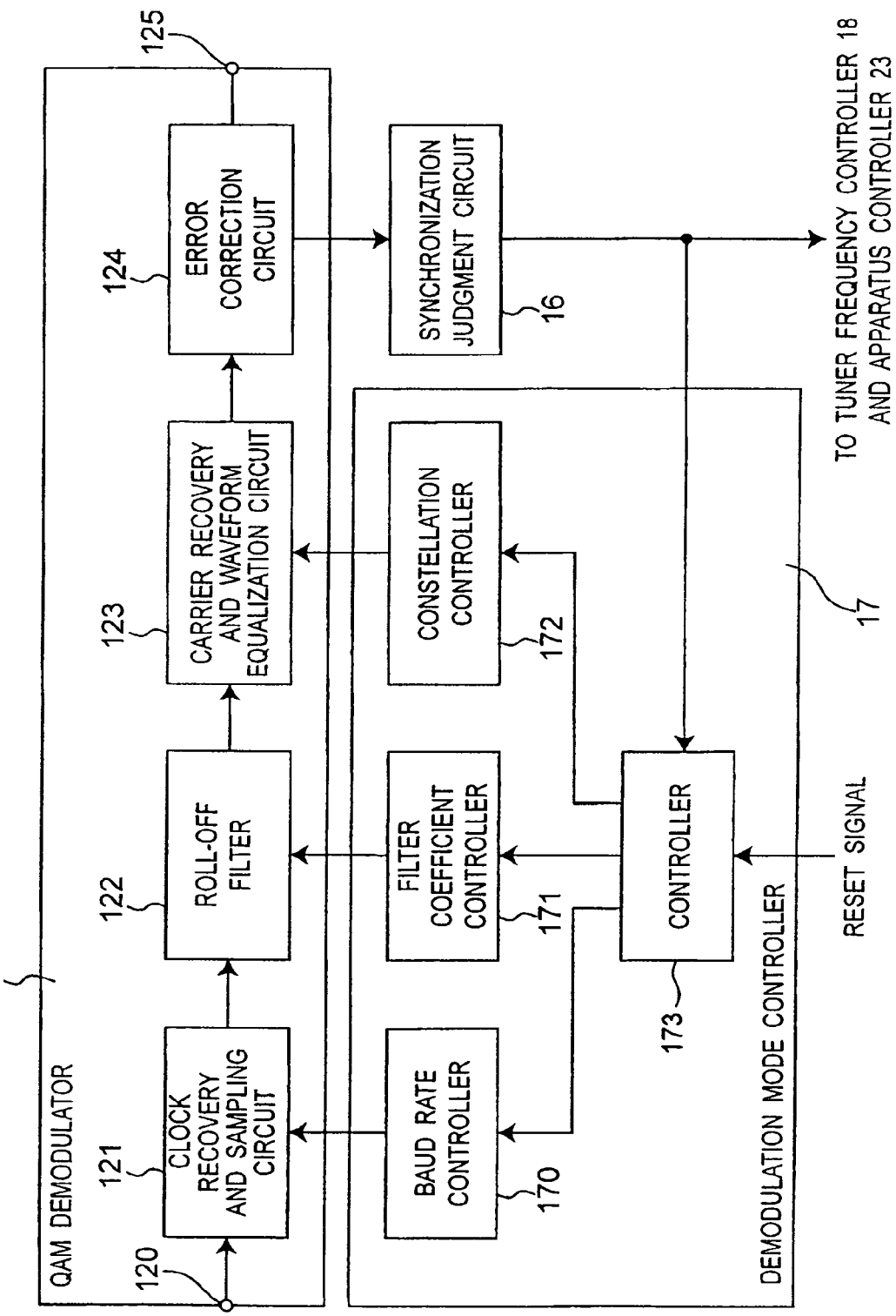
FIG. 2 is a block diagram showing a configuration of a QAM demodulator 12, a demodulation mode controller 17, and a synchronization judgment circuit 16 shown in FIG. 1.

FIG. 2 is a block diagram showing a configuration of the QAM demodulator 12, the demodulation mode controller 17, and the synchronization judgment circuit 16 shown in FIG. 1. Referring to FIG. 2, the QAM demodulator 12 includes an input terminal 120, a clock recovery and sampling circuit 121, a roll-off filter 122, a carrier recovery and waveform equalization circuit 123, an error correction circuit 124, and an output terminal 125. The demodulation mode controller 17 includes a baud rate controller 170, a filter coefficient controller 171, a constellation controller 172, and a controller 173.

A basic operation of the QAM demodulator 12 will be first described. The QAM-modulated signal inputted through the input terminal 120 is first inputted to the clock recovery and sampling circuit 121. The clock recovery and sampling circuit 121 reproduces a clock signal synchronized in phase with a modulation clock of the received QAM-modulated signal at a predetermined baud rate, that is, reproduces the clock signal with which the QAM-modulated signal can be sampled at coding points of the QAM constellation. In addition, the clock recovery and sampling circuit 121 samples the inputted QAM-modulated signal based on the reproduced clock signal, and outputs the sampled QAM-modulated signal to the carrier recovery and waveform equalization circuit 123 through the roll-off filter 122 for performing a band limitation at predetermined roll-off coefficients. The carrier recovery and waveform equalization circuit 123 reproduces a carrier wave synchronized in phase with a carrier wave of the inputted QAM-modulated signal using a constellation according to a predetermined modulation system. The carrier recovery and waveform equalization circuit 123 removes a phase deviation and a frequency deviation of the inputted QAM-modulated signal based on the reproduced carder wave, and removes a reflection component contained in the inputted QAM-modulated signal. Then, the carrier recovery and waveform equalization circuit 123 outputs an output signal to the error correction circuit 124. The error correction circuit 124 decodes an error correction code encoded on a transmission side for the output signal from the carrier recovery and waveform equalization circuit 123 inputted to the error correction circuit 124. Then the error correction circuit 124 corrects a bit error due to a noise or the like on a transmission line, and outputs error-corrected data through the output terminal 125 as the FAT data.

A demodulation mode control processing will be described.

The baud rate controller 170 is controlled by the controller 173, and is connected with the clock recovery and sampling circuit 121 of the QAM demodulator 12. The baud rate controller 170 sets a baud rate corresponding to the QAM-modulated signal which is likely to be received as an initial value of a phase synchronization loop for the clock recovery, to the clock recovery and sampling circuit 121. The clock recovery and sampling circuit 121 calculates an error between the set baud rate and the baud rate of the received QAM-modulated signal, so as to reproduce the clock signal.

The filter coefficient controller 171 is controlled by the controller 173, and is connected with the roll-off filter 122 of the QAM demodulator 12. The filter coefficient controller 171 sets filter coefficients corresponding to the QAM-modulated signal which is likely to be received, to the roll-off filter 122. The constellation controller 172 is controlled by the controller 173, and is connected with the carrier recovery and waveform equalization circuit 123 of the QAM demodulator 12. The constellation controller 172 sets an ideal constellation corresponding to the QAM-modulated signal which is likely to be received, to the carrier recovery and waveform equalization circuit 123. The carrier recovery and waveform equalization circuit 123 calculates an error between the set ideal constellation and a constellation of the received QAM-modulated signal, so as to carry out the carrier recovery and waveform equalization processings.

The synchronization judgment circuit 16 judges whether or not the QAM demodulator 12 can be synchronized with the received QAM-modulated signal based on whether or not a synchronous signal (a unique word) in a specific frame among transmitted frames of the QAM-modulated signal can be detected based on the output signal from the error correction circuit 124 of the QAM demodulator 12. The synchronization judgment circuit 16 outputs a synchronization judgment result signal to the controller 173, the tuner frequency controller 18, and the apparatus controller 23.

The controller 173 controls the baud rate controller 170, the filter coefficient controller 171 and the constellation controller 172 based on the synchronization judgment result signal of the QAM demodulator 12 outputted from the synchronization judgment circuit 16. For example, if the demodulation mode to the QAM-modulated signal which is likely to be received includes a plurality of demodulation modes (MODE) in the demodulation mode table stored in the data memory 23*m* and shown in FIG. 3, the controller 173 sets the baud rate (which is not limited to the baud rate according to the present invention, and which may be a modulation rate such as a symbol rate corresponding to the modulation system of the modulated broadcasting signal, which can be applied to the below embodiments), the roll-off coefficients, and the constellation corresponding to a modulation format, corresponding to the demodulation system in, for example, a demodulation mode MODE=0 (where the demodulation system will be referred to as a demodulation system corresponding to the modulation system of the modulated broadcasting signal), to the clock recovery and sampling circuit 121, the roll-off filter 122, and the carrier recovery and waveform equalization circuit 123 of the QAM demodulator 12, respectively. Then, if the QAM demodulator 12 cannot be synchronized with the input signal for a predetermined period of time, the controller 173 instructs the baud rate controller 170, the filter coefficient controller 171, and the constellation controller 172 to switch the baud rate, the roll-off coefficients, and the constellation corresponding to the modulation format thus set to a baud rate, roll-off coefficients, and a constellation corresponding to the modulation format corresponding to a setting different from the previous setting, e.g., a demodulation system in a demodulation mode MODE=1, respectively.

As described above, since the demodulation mode is detected and controlled based on the synchronization result of the QAM demodulator 12, the demodulation mode control can be executed more certainly at a higher speed.

In the present preferred embodiment, the synchronization judgment circuit 16 judges whether or not the QAM demodulator 12 is synchronized with the QAM-modulated signal based on whether or not the synchronous signal (the unique word) in the specific frame among transmitted frames can be detected based on the output signal from the error correction circuit 124. Alternatively, a synchronization judgment method other than this method may be used, which will be described later in detail.

Figure 4:
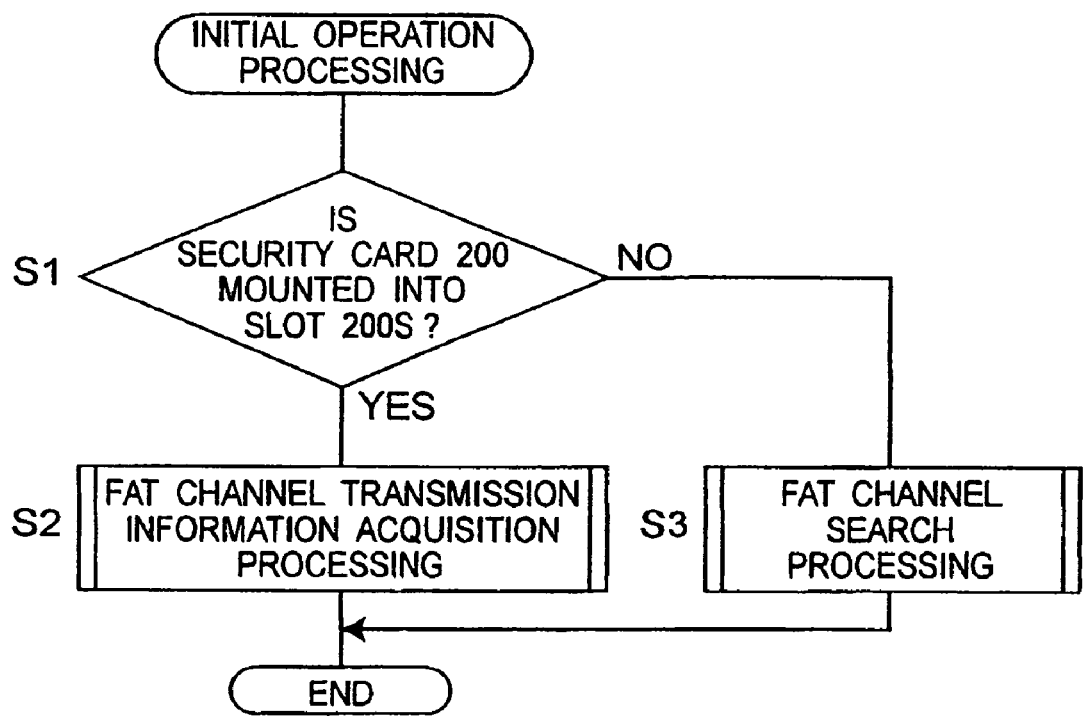
FIG. 4 is a flowchart showing an initial operation processing executed by an apparatus controller 23 shown in FIG. 1.

FIG. 4 is a flowchart showing an initial operation processing executed by the apparatus controller 23 shown in FIG. 1. The initial operation processing is executed, for example, when the STB 100 is initially disposed, or when a power is turned on. Referring to FIG. 4, at step S1, it is judged whether or not the security card 200 is mounted into the slot 200S. If the judgment result is YES, the control flow goes to step S2. If the judgment result is NO, the control flow goes to step S3. At step S2, after executing an FAT channel transmission information acquisition processing shown in FIG. 5, the initial operation processing is finished. At step S3, after executing an FAT channel retrieve processing shown in FIG. 6, the initial operation processing is finished.

Figure 5:
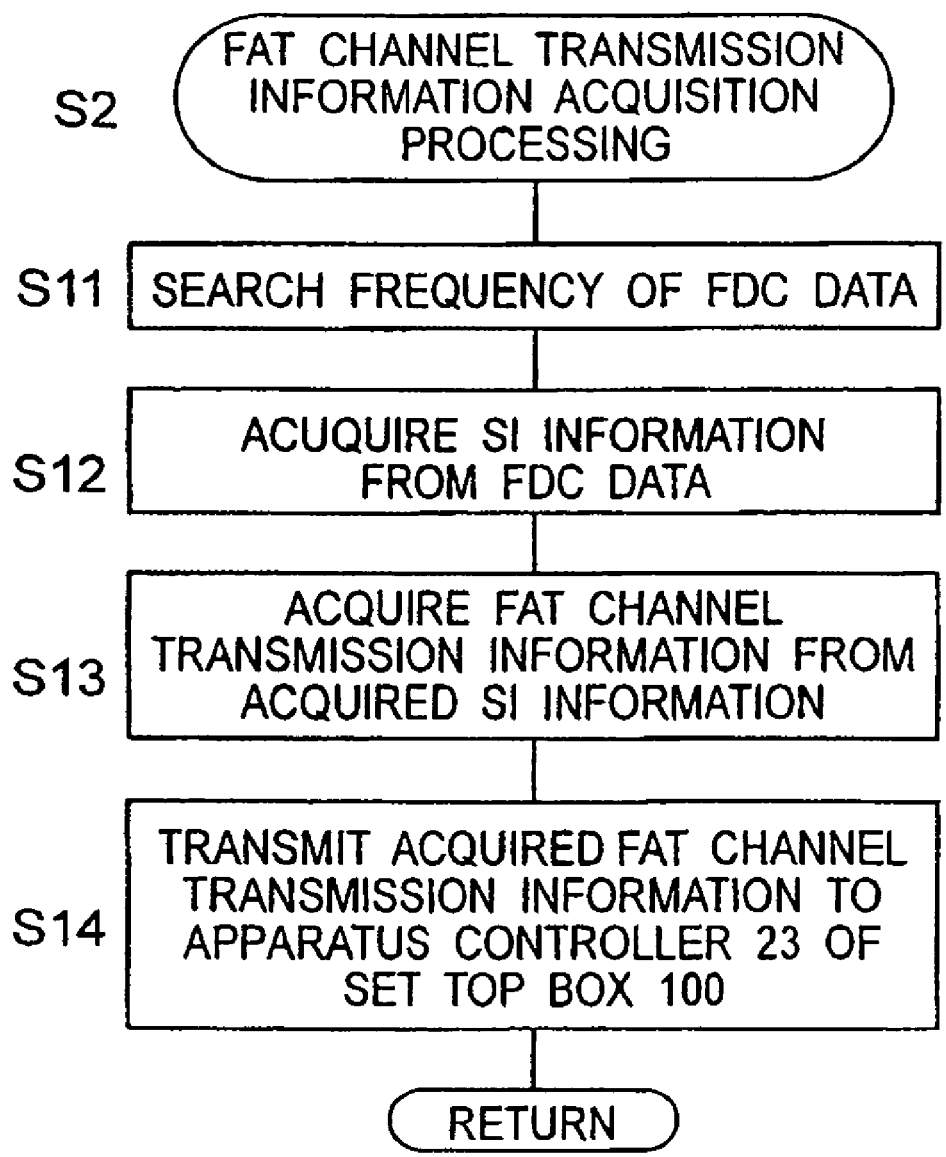
FIG. 5 is a flowchart showing an FAT channel transmission information acquisition processing (step S2) which is a subroutine of the processing shown in FIG. 4.

FIG. 5 is a flowchart showing an FAT channel transmission information acquisition processing (the step S2) which is a subroutine of the processing shown in FIG. 4. In the FAT channel reception, it is necessary to know which frequency in the frequency band from 54 to 864 MHz in which modulation system the broadcasting signal is transmitted. The SI information as information necessary for this end is transmitted with the FDC data. Prior to reception of the FAT channel, the STB 100 extracts FAT channel transmission information from FDC channels under control of the security card 200 as an initial operation.

Referring to FIG. 5, at step S11, an FDC channel which corresponds to a frequency of the FDC data is retrieved in a frequency band from 70 to 130 MHz. At step S12, the SI information is acquired from the retrieved FDC data. At step S13, the FAT channel transmission information is extracted from the acquired SI information. At step S14, the acquired FAT channel transmission information is transmitted to the apparatus controller 23 of the STB 100, and the control flow returns to the original main routine. By executing the processing shown in FIG. 5, later FAT channel reception is possible.

Figure 6:
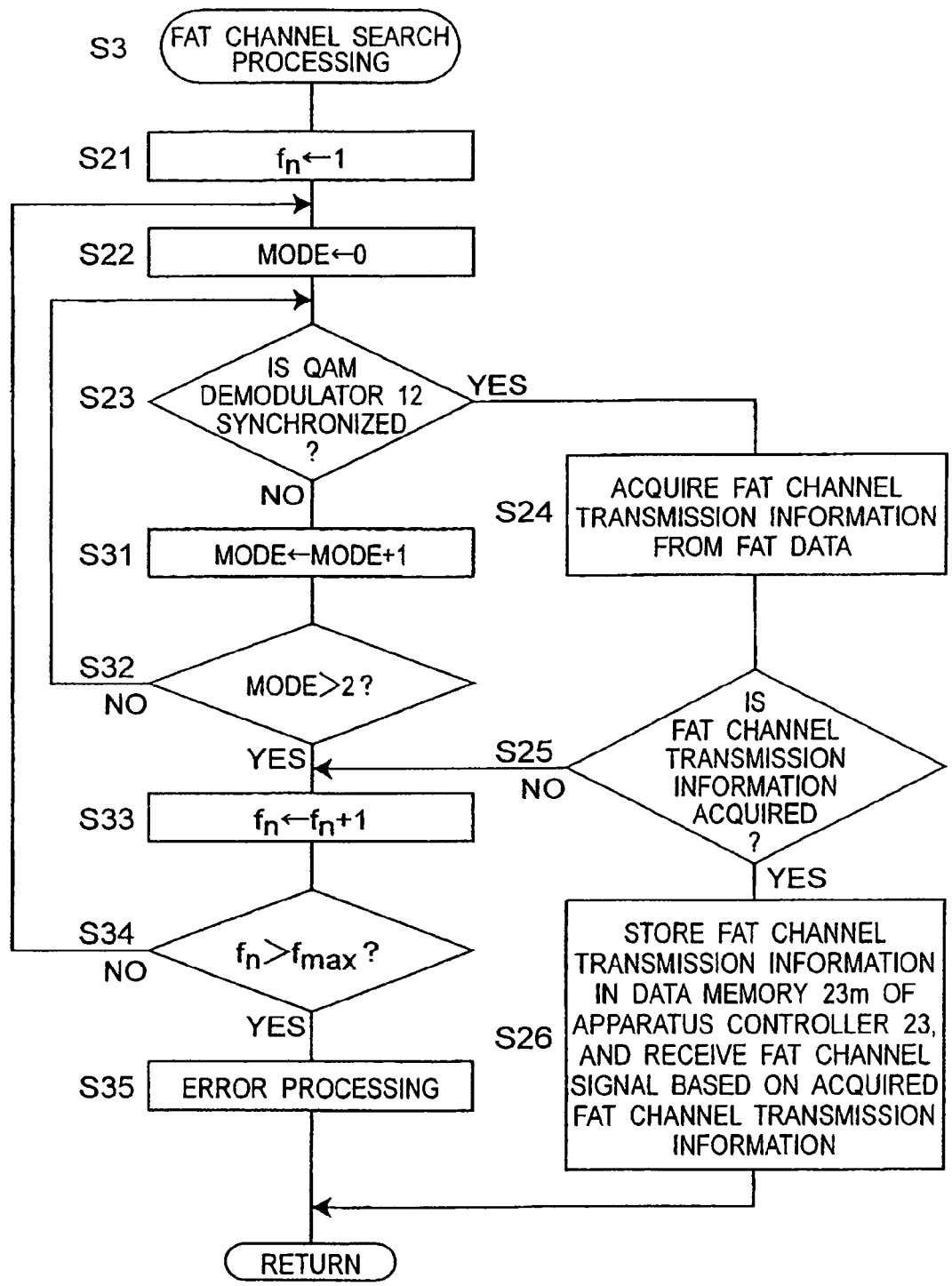
FIG. 6 is a flowchart showing an FAT channel retrieve processing (step S3) which is a subroutine of the processing shown in FIG. 4.

FIG. 6 is a flowchart showing an FAT channel retrieve processing (the step S3) which is a subroutine of the processing shown in FIG. 4. It is assumed in FIG. 6 that a frequency channel number on the FAT channels is $f_n$, and that the channel number $f_n$ ranges from channel numbers 1 to $f_{max}$.

Referring to FIG. 6, at step S21, the apparatus controller 23 instructs the tuner frequency controller 18 to set a selected frequency of the QAM tuner 11 to a certain initial frequency. Namely, the channel number $f_n$ is initialized to one. When the frequency setting for the QAM tuner 11 is completed, the apparatus controller 23 controls the demodulation mode controller 17 to set the demodulation mode (MODE) of the QAM demodulator 12 to zero at step S22. Namely, the demodulation mode (MODE) is initialized to zero. At step S23, the synchronization judgment circuit 16 judges whether or not the QAM demodulator 12 is synchronized with the QAM-modulated signal. If the judgment result is YES, the control flow goes to step S24. If the judgment result is NO, the control flow goes to step S31. At step S31, the apparatus controller 23 controls the demodulation mode controller 17 to increment the waiting demodulation mode (MODE) of the QAM demodulator 12 by one. At step S32, it is judged whether or not the modulation mode (MODE) is two or more. If the judgment result is YES, the control flow goes to step S33. If the judgment result is NO, the control flow returns to the step S23, and then, the processing of the step S23 is executed. At step S33, the channel number $f_n$ is incremented by one. At step S34, it is judged whether or not the channel number $f_n$ is larger than the maximum channel number $f_{max}$. If the judgment result is YES, the control flow goes to step S35. If the judgment result is NO, the control flow returns to the step S22. At step S35, an error processing is executed, information on the demodulation system corresponding to the modulation system and the like, i.e., information as to presence or absence of respective channels obtained by the channel retrieve executed so far and the modulation system with which the QAM demodulator 12 can be synchronized, in the data memory 23m. Then the control flow returns to the original main routine.

At step S24, the FAT channel transmission information is acquired from the FAT data. At step S25, it is judged whether or not the FAT channel transmission information can be acquired at step S24. If the judgment result is YES, the control flow goes to step S26. If the judgment result is NO, the control flow goes to step S33. At step S26, the FAT channel transmission information is stored in the data memory 23m of the apparatus controller 23, then an FAT channel signal is received based on the FAT channel transmission information, and the control flow returns to the original main routine.

As described above, even if the viewer who sees only toll-free broadcasting programs does not mount the security card 200 into the slot 200S of the STB 100, then the FAT channel transmission information can be acquired, and the desired FAT channel can be received at a higher speed with higher efficiency from among a plurality of FAT channels in the frequency band from 54 to 864 MHz, by allowing the STB 100 to execute the initial operation processing shown in FIG. 6 prior to reception of the FAT channel.

In the preferred embodiment as described above, the content of the demodulation mode table shown in FIG. 3 is given only as one example, and various other baud rates (including modulation rates such as symbol rates or the like) and various other roll-off coefficients can be used. Further, only two demodulation modes are described in the demodulation mode table shown in FIG. 3. Alternatively, the constellation of the modulation system, the modulation rate such as the baud rate or the like, and the roll-off coefficients may be individually controlled until the QAM demodulator 12 is synchronized with the received QAM-modulated signal. Alternatively, at least one of the constellation of the modulation system, the modulation rate such as the baud rate or the like, and the roll-off coefficients may be controlled until the QAM demodulator 12 is synchronized with the received QAM-modulated signal.

In the preferred embodiment as described above, the demodulation mode controller 17, the synchronization judgment circuit 16, and the tuner frequency controller 18 are each constituted by hardware circuits. Alternatively, each of the demodulation mode controller 17, the synchronization judgment circuit 16, and the tuner frequency controller 18 may be constituted by software using, for example, MPU or DSP. However, it is noted that by constituting each of the demodulation mode controller 17, the synchronization judgment circuit 16, and the tuner frequency controller 18 by the hardware, a communication time of the apparatus controller 23 can be shortened, and the processing can be executed at a higher speed.

Figure 7:
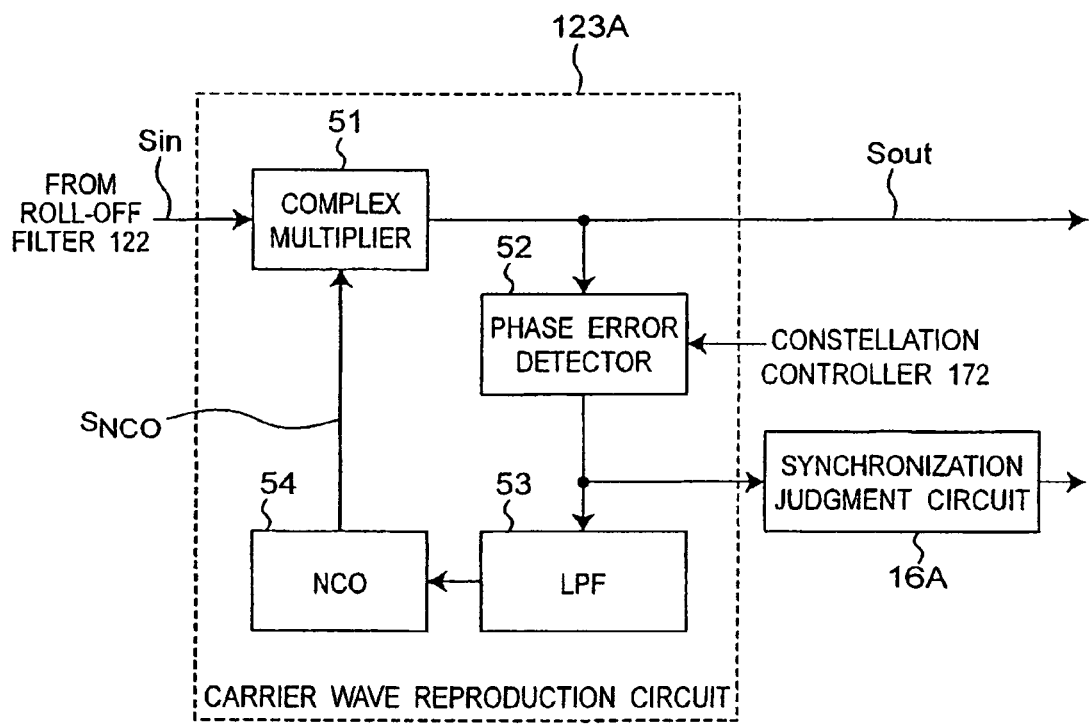
FIG. 7 is a block diagram showing a configuration of a carrier recovery circuit 123A and a synchronization judgment circuit 16A according to a first modified preferred embodiment of the present invention.

FIG. 7 is a block diagram showing a configuration of a carrier recovery circuit 123A and a synchronization judgment circuit 16A according to a first modified preferred embodiment of the present invention. The first modified preferred embodiment is characterized by executing a synchronization judgment based on a phase error generated after carrier recovery. In FIG. 7, the carrier recovery circuit 123A includes a complex multiplier 51, a phase error detector 52, a low-pass filter (LPF) 53, and a numeric control oscillator (NCO) 54.

Referring to FIG. 7, the digital modulated signal subjected to waveform shaping by the roll-off filter 122 is inputted to the complex multiplier 51. It is assumed herein that a frequency error (or frequency deviation) Δω and a phase error (or phase deviation) Δθ of this digital signal (referred to as an input signal hereinafter) Sin remain therein. Then in the I and Q axes orthogonal to each other, an in-phase signal component of the input signal Sin on an I axis is set to Si, and an orthogonal signal component of the input signal Sin on a Q axis is set to Sq. In this case, the input signal Sin is represented by the following Equation (1):

$$Sin = (Si+jSq) \cdot \exp(j(\Delta \omega t + \Delta \theta)) \qquad (1).$$

The NCO 54 outputs an oscillation signal $S_{NCO}$, which is conjugate with a carrier wave signal $\exp(j(\Delta\omega t+\Delta\theta))$ of the input signal Sin represented by the Equation (1). The oscillation signal $S_{NCO}$ is represented by the following Equation (2):

$$S_{NCO} = \exp(-j(\Delta \omega t + \Delta \theta)) \qquad (2).$$

The complex multiplier 51 performs a complex multiplication between the oscillation signal $S_{NCO}$ from the NCO 54 and the input signal Sin, so as to remove the frequency error Δω and the phase error Δθ of the input signal Sin, and then, outputs a demodulated signal Sout=(Si+jSq) as represented by the following Equation (3):

$$Sout = (Si + jSq) \cdot \exp(j(\Delta \omega t + \Delta \theta)) \cdot \exp(-j(\Delta \omega t + \Delta \theta)) \qquad (3)$$
$$= (Si + jSq).$$

The demodulated signal Sout from the complex multiplier 51 is also inputted to the phase error detector 52. The phase error detector 52 detects the phase error of the received digital modulated signal from a real part Si and an imaginary part Sq of the demodulated signal Sout based on the control signal being transmitted from the constellation controller 172 and indicating the constellation. An output signal from the phase error detector 52 is inputted to the LPF 53 of a loop filter. The LPF 53 removes a high frequency component of the phase error, and inputs the resultant phase error to the NCO 54 as a control signal. The oscillation signal $S_{NCO}$ from the NCO 54 controlled by an output signal from the LPF 53 is supplied to the complex multiplier 51.

As represented by the Equations (1) and (2), if the oscillation signal $S_{NCO}$ from the NCO 54 is conjugate with the carrier wave signal of the input signal Sin, that is, the input signal Sin includes no frequency error Δω and no phase error Δθ, the phase error detected by the phase error detector 52 is zero. However, if the phase difference is present between the Equations (1) and (2), then the phase error detector 52 detects the phase error, and outputs a voltage corresponding to the phase error to the NCO 54 through the LPF 53.

The synchronization judgment circuit 16A time-averages the output signal being transmitted from the phase error detector 52 and indicating the phase error, and compares the average phase error with a predetermined threshold value. If the average phase error is smaller than the threshold value, then the synchronization judgment circuit 16A judges that the QAM demodulator 12 is synchronized with the QAM-modulated signal, and outputs a synchronization judgment result signal to the demodulation mode controller 17, the tuner frequency controller 18, and the apparatus controller 23 shown in FIG. 1, respectively.

In the carrier recovery circuit 123A shown in FIG. 7, a negative feedback control loop is constituted so as to cancel the phase error detected by the phase error detector 52. Therefore, a carrier wave synchronized in phase with the received digital modulated signal is reproduced by the NCO 54. This reproduced carrier wave is conjugate with the carrier wave signal of the input signal Sin, and the input signal Sin includes no frequency error Δω and no phase error Δθ. Accordingly, an accurate demodulated signal can be acquired.

By the way, if the constellation indicated by the control signal outputted from the constellation controller 172 coincides with the received digital modulated signal, then the phase error detector 52 can accurately detect the phase error, and the negative feedback control loop functions so as to cancel the phase error. Therefore, the phase error detected by the phase error detector 52 becomes zero, finally. However, if the constellation indicated by the control signal outputted from the constellation controller 172 does not coincide with the received digital modulated signal, then the phase error detector 52 cannot detect an accurate phase error, and the negative feedback control loop does not normally operate. As a result, an unstable state, i.e., a state in which the phase error is not zero continues.

Figure 8:
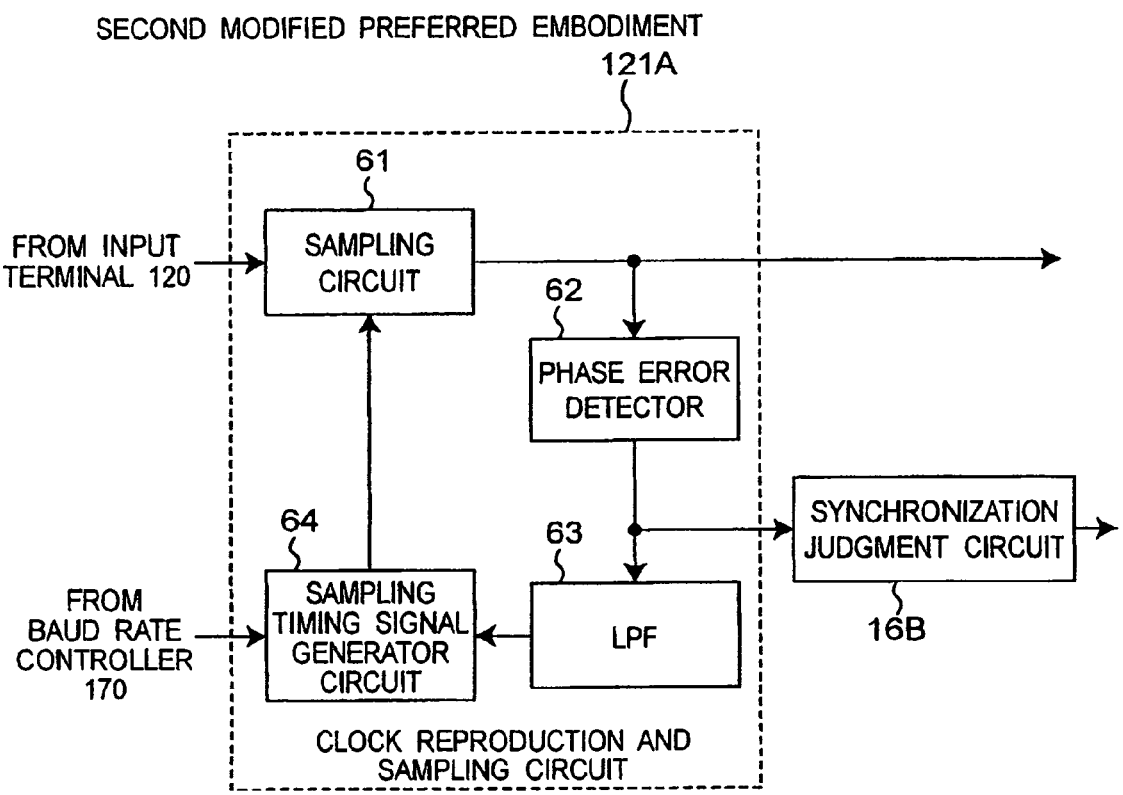
FIG. 8 is a block diagram showing a clock recovery and sampling circuit 121A and a synchronization judgment circuit 16B according to a second modified preferred embodiment of the present invention.

FIG. 8 is a block diagram showing a clock recovery and sampling circuit 121A and a synchronization judgment circuit 16B according to a second modified preferred embodiment of the present invention. The second modified preferred embodiment is characterized by executing a synchronization judgment based on a phase error detected by the clock recovery and sampling circuit 121A. In FIG. 8, the clock recovery and sampling circuit 121A includes a sampling circuit 61, a phase error detector 62, a low-pass filter (LPF) 63 which is a loop filter, and a sampling timing signal generation circuit 64.

Referring to FIG. 8, the digital modulated signal inputted to the input terminal 120 shown in FIG. 2 is inputted to the sampling circuit 61. This inputted digital modulated signal is obtained by A/D converting one modulated signal tuned and extracted by the QAM tuner 11 shown in FIG. 1 by an A/D converter (not shown) provided in a final stage of the QAM tuner 11. A sampling timing at which the A/D converter performs A/D conversion is not a timing including the coding points for the received digital modulated signal. Therefore, the sampling circuit 61 interpolates the inputted digital modulated signal so as to include the coding points based on a sampling timing signal outputted from the sampling timing signal generation circuit 64, and performs clock recovery and sampling processings. An output signal sampled so as to include the coding points for the inputted digital modulated signal by the sampling circuit 61 and outputted from the sampling circuit 61 is outputted to the roll-off filter 122 provided in the subsequent stage of the clock recovery and sampling circuit 121A shown in FIG. 2, and is also outputted to the phase error detector 62. The phase error detector 62 detects a sampling phase deviation (error) of the digital modulated signal outputted from the sampling circuit 61, and outputs a voltage corresponding to the detected deviation (error) to the sampling timing signal generation circuit 64 through the LPF 63. In response to this, the sampling timing signal generation circuit 64 generates a sampling timing signal based on the voltage corresponding to the sampling timing phase error so that the voltage becomes zero and outputs the sampling timing signal to the sampling circuit 61.

The synchronization judgment circuit 16B time-averages the voltage being outputted from the phase error detector 62 and indicating the phase error of the sampling timing, and compares the average phase error with a predetermined threshold value. If the averaged value is smaller than the threshold value, then the synchronization judgment circuit 16B judges that the QAM demodulator 12 is synchronized with the QAM-modulated signal, and outputs a synchronization judgment result signal to the demodulation mode controller 17, the tuner frequency controller 18, and the apparatus controller 23, respectively.

If the coding point timing generated by the sampling timing signal generation circuit 64 includes the coding points for the inputted digital modulated signal, the phase error of the sampling timing detected by the phase error detector 62 becomes zero. If the coding point timing of the sampling timing signal generated by the sampling timing signal generation circuit 64 does not include the coding point for the inputted digital modulated signal, the phase error detector 62 detects and outputs the phase error.

In the clock recovery and sampling circuit 121A shown in FIG. 8, a negative feedback control loop is constituted so as to cancel the phase error of the sampling timing detected by the phase error detector 62. Therefore, a timing synchronized in phase with the coding point for the received digital modulated signal is reproduced and generated by the sampling timing signal generation circuit 64. This reproduced timing signal includes the coding points for the inputted digital modulated signal. The correct coding points can be thus obtained.

By the way, if the baud rate indicated by the control signal outputted from the baud rate controller 170 to the sampling timing signal generation circuit 64 is adapted to the baud rate of the received digital modulated signal, then the phase error detector 62 can accurately detect the phase error of the clock signal, and the negative feedback control loop functions so as to cancel the phase error. Therefore, the phase error detected by the phase error detector 62 becomes zero, finally. However, if the baud rate indicated by the control signal outputted from the baud rate controller 170 to the sampling timing signal generation circuit 64 is not adapted to the baud rate of the received digital modulated signal, then the accurate timing phase error cannot be detected, and the negative feedback control loop does not operate normally. As a result, an unstable state, i.e., a state in which the phase error is not zero continues.

In the preferred embodiments mentioned above, the examples of applying the present invention into the demodulation mode control using the STB 100 which receives the CATV broadcasting signal is described. However, the present invention is not limited to this. The present invention can be applied to the demodulation mode control over a digital modulated signal received through a predetermined transmission medium, whether the medium is a wired or a radio medium.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A broadcasting signal receiver apparatus comprising:
   a security device for storing security information on a broadcasting entity, and for extracting SI (Service Information) information for receiving a broadcasting signal modulated in a predetermined modulation mode from a control signal transmitted from an apparatus of the broadcasting entity, and
   a receiver for receiving the broadcasting signal transmitted from the apparatus of the broadcasting entity based on extracted transmission information, p1 wherein said security device is separated from said receiver, and can be mounted in said receiver, and
   wherein said receiver comprises:
      a first tuner for controlling a frequency of the received broadcasting signal to select a channel of a predetermined broadcasting signal;
      a first demodulator capable of demodulating the broadcasting signal transmitted from the apparatus of the broadcasting entity in a plurality of demodulation modes corresponding to modulation modes of modulation systems of the broadcasting signal, said first demodulator demodulating the broadcasting signal of the channel selected by said first tuner in a demodulation mode which is set among the plurality of demodulation modes;
      a first controller for controlling the demodulation mode of said first demodulator;
      a synchronization judgment unit for judging whether or not said first demodulator is synchronized with the received broadcasting signal, and for outputting a synchronization judgment result signal;
      a second tuner for controlling a frequency of the received broadcasting signal to select a channel of a predetermined control signal;
      a second demodulator for demodulating the control signal of the channel selected by said second tuner and outputting FDC (Forward Data Channel) data;
      a device detector for detecting whether or not said security device is mounted in said receiver; and
      a second controller for:
         when it is detected by said device detector that said security device is mounted in said receiver, (1) extracting transmission information from the SI information extracted by said security device, the SI information being transmitted with the FDC data, and (2) receiving the broadcasting signal based on the extracted transmission information; and
         when it is detected by said device detector that said security device is not mounted in said receiver, (1) controlling said first tuner, said first demodulator, and said first controller, so as to change at least one of the demodulation mode for the broadcasting signal and the frequency of the broadcasting signal, and to retrieve a broadcasting channel on which the transmission information on the broadcasting signal is transmitted, (2) receiving the broadcasting signal on said retrieved broadcasting channel, (3) when said synchronization judgment unit judges that said first demodulator is synchronized with the broadcasting signal, extracting the transmission information on the broadcasting channel from the broadcasting signal demodulated by said first demodulator, and storing the extracted transmission information in a data memory, and (4) receiving the broadcasting signal based on the extracted transmission information on the broadcasting signal.

2. The broadcasting signal receiver apparatus as claimed in claim 1,
   wherein said second controller initializes a demodulation mode control processing executed by said first controller immediately after the frequency of said first tuner is changed.

3. The broadcasting signal receiver apparatus as claimed in claim 1,
wherein said first controller controls at least one of a modulation rate, filter coefficients, and a constellation which are set to said first demodulator based on the synchronization judgment result signal from said synchronization judgment unit until said first demodulator is synchronized with the received broadcasting signal.

4. The broadcasting signal receiver apparatus as claimed in claim 1,
wherein said first demodulator comprises a carrier recovery circuit which reproduces a carrier wave of the received broadcasting signal, and
wherein said synchronization judgment unit judges whether or not said first demodulator is synchronized with the received broadcasting signal based on a phase error of a demodulated signal reproduced by said carrier recovery circuit.

5. The broadcasting signal receiver apparatus as claimed in claim 1,
wherein said first demodulator comprises a clock recovery circuit which reproduces a clock signal of the received broadcasting signal, and
wherein said synchronization judgment unit judges whether or not said first demodulator is synchronized with the received broadcasting signal based on a phase error of the clock signal reproduced by said clock signal recovery circuit.

6. The broadcasting signal receiver apparatus as claimed in claim 1,
wherein said first demodulator comprises an error correction circuit which corrects an error of the received broadcasting signal, and
wherein said synchronization judgment unit judges whether or not said first demodulator is synchronized with the received broadcasting signal based on whether or not a frame synchronous signal outputted from said error correction circuit can be detected.

7. The broadcasting signal receiver apparatus as claimed in claim 1,
wherein each of said first controller and said synchronization judgment unit is constituted by a hardware circuit.

8. A receiver for use with a removable security device, wherein the security device stores security information on a broadcasting entity and extracts SI (Service Information) information for receiving a broadcasting signal modulated in a predetermined modulation mode from a control signal transmitted from an apparatus of the broadcasting entity, the security device being removably mounted in said receiver, wherein said receiver receives the broadcasting signal transmitted from the apparatus of the broadcasting entity based on extracted transmission information, said receiver comprising:
a first tuner for controlling a frequency of the received broadcasting signal to select a channel of a predetermined broadcasting signal;
a first demodulator capable of demodulating the broadcasting signal transmitted from the apparatus of the broadcasting entity in a plurality of demodulation modes corresponding to modulation modes of modulation systems of the broadcasting signal, said first demodulator demodulating the broadcasting signal of the channel selected by said first tuner in a demodulation mode which is set among the plurality of demodulation modes;
a first controller for controlling the demodulation mode of said first demodulator;
a synchronization judgment unit for judging whether or not said first demodulator is synchronized with the received broadcasting signal, and for outputting a synchronization judgment result signal;
a second tuner for controlling a frequency of the received broadcasting signal to select a channel of a predetermined control signal;
a second demodulator for demodulating the control signal of the channel selected by said second tuner and outputting FDC (Forward Data Channel) data;
a device detector for detecting whether or not the security device is mounted in said receiver; and
a second controller for:
when it is detected by said device detector that the security device is mounted in said receiver, (1) extracting transmission information from the SI information extracted by the security device, the SI information being transmitted with the FDC data, and (2) receiving the broadcasting signal based on the extracted transmission information; and
when it is detected by said device detector that the security device is not mounted in said receiver, (1) controlling said first tuner, said first demodulator, and said first controller, so as to change at least one of the demodulation mode for the broadcasting signal and the frequency of the broadcasting signal, and to retrieve a broadcasting channel on which the transmission information on the broadcasting signal is transmitted, (2) receiving the broadcasting signal on said retrieved broadcasting channel, (3) when said synchronization judgment unit judges that said first demodulator is synchronized with the broadcasting signal, extracting the transmission information on the broadcasting channel from the broadcasting signal demodulated by said first demodulator, and storing the extracted transmission information in a data memory, and (4) receiving the broadcasting signal based on the extracted transmission information on the broadcasting signal.

9. The receiver as claimed in claim 8,
wherein said second controller initializes a demodulation mode control processing executed by said first controller immediately after the frequency of said first tuner is changed.

10. The receiver as claimed in claim 8,
wherein said first controller controls at least one of a modulation rate, filter coefficients, and a constellation which are set to said first demodulator based on the synchronization judgment result signal from said synchronization judgment unit until said first demodulator is synchronized with the received broadcasting signal.

11. The receiver as claimed in claim 8,
wherein said first demodulator comprises a carrier recovery circuit which reproduces a carrier wave of the received broadcasting signal, and
wherein said synchronization judgment unit judges whether or not said first demodulator is synchronized with the received broadcasting signal based on a phase error of a demodulated signal reproduced by said carrier recovery circuit.

12. The receiver as claimed in claim 8,
wherein said first demodulator comprises a clock recovery circuit which reproduces a clock signal of the received broadcasting signal, and
wherein said synchronization judgment unit judges whether or not said first demodulator is synchronized with the received broadcasting signal based on a phase error of the clock signal reproduced by said clock signal recovery circuit.

13. The receiver as claimed in claim 8,
wherein said first demodulator comprises an error correction circuit which corrects an error of the received broadcasting signal, and
wherein said synchronization judgment unit judges whether or not said first demodulator is synchronized with the received broadcasting signal based on whether or not a frame synchronous signal outputted from said error correction circuit can be detected.

14. The receiver as claimed in claim 8,
wherein each of said first controller and said synchronization judgment unit is constituted by a hardware circuit.

* * * * *